(12) United States Patent
Gisquet et al.

(10) Patent No.: US 9,420,303 B2
(45) Date of Patent: Aug. 16, 2016

(54) METHOD AND APPARATUS FOR DISPLACEMENT VECTOR COMPONENT TRANSFORMATION IN VIDEO CODING AND DECODING

(71) Applicant: CANON KABUSHIKI KAISHA, Tokyo (JP)

(72) Inventors: Christophe Gisquet, Rennes (FR); Guillaume Laroche, Melesse (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 14/512,043

(22) Filed: Oct. 10, 2014

(65) Prior Publication Data

US 2015/0103916 A1     Apr. 16, 2015

(30) Foreign Application Priority Data

Oct. 11, 2013   (GB) .................................. 1318082.3

(51) Int. Cl.
*H04N 5/14* (2006.01)
*H04N 9/64* (2006.01)
*H04N 19/51* (2014.01)
*H04N 19/56* (2014.01)
*H04N 19/52* (2014.01)

(52) U.S. Cl.
CPC .............. *H04N 19/51* (2014.11); *H04N 19/52* (2014.11); *H04N 19/56* (2014.11)

(58) Field of Classification Search
CPC ........ H04N 19/51; H04N 19/56; H04N 19/52
See application file for complete search history.

(56) References Cited

U.S. PATENT DOCUMENTS

| 7,616,692 B2 * | 11/2009 | Holcomb ................ H04N 19/70 375/240.16 |
| 2013/0128981 A1 * | 5/2013 | Kazui .............. H04N 19/00569 375/240.16 |
| 2013/0129238 A1 * | 5/2013 | Sasai ......................... G06T 9/00 382/233 |

FOREIGN PATENT DOCUMENTS

WO         00/19725 A1     4/2000
WO   WO 2011/146451 A1 *  11/2011

* cited by examiner

*Primary Examiner* — Sath V Perungavoor
*Assistant Examiner* — Philip Dang
(74) *Attorney, Agent, or Firm* — Canon USA, Inc. I.P. Division (57) ABSTRACT

A method and a device for transforming a displacement vector component in the process of encoding or decoding a video. It applies more particularly to a mode of coding where a block of pixel is predictively encoded based on a predictor block pertaining to the same image. This mode of encoding a block of pixel is generally referred to as INTRA Block Copy mode. It proposes to take into account the particular constraints brought by the causal principle in the range of admissible values of the components of the displacement vector. In particular, for some values of one first component, the second component is transformed in order to improve the coding efficiency for it. Accordingly, the magnitude of the second component is reduced improving the coding of its value.

10 Claims, 8 Drawing Sheets

METHOD AND APPARATUS FOR DISPLACEMENT VECTOR COMPONENT TRANSFORMATION IN VIDEO CODING AND DECODING

REFERENCE TO RELATED APPLICATIONS

This application claims the benefit under 35 U.S.C. §119 (a)-(d) of United Kingdom Patent Application No. 1318082.3, filed on Oct. 11, 2013 and entitled "Method and apparatus for displacement vector component transformation in video coding and decoding". The above cited patent application is incorporated herein by reference in its entirety.

BACKGROUND OF THE INVENTION

The present invention concerns a method and a device for transforming a displacement vector component in the process of encoding or decoding a video.

It applies more particularly to a mode of coding where a block of pixel is predictively encoded based on a predictor block pertaining to the same image. This mode of encoding a block of pixel is generally referred to as INTRA Block Copy mode. It is contemplated to adopt this mode, for example, in lossless configuration of the Range Extension of the High Efficiency Video Coding (HEVC: ISO/IEC 23008-2 MPEG-H Part 2/ITU-T H.265) international standard.

When encoding an image in a video sequence, the image is first divided into large blocks referred to as Coding Tree Block (CTB). The size of a Coding Tree Block is typically 64 by 64 pixels. Each Coding Tree Block may then be decomposed in a hierarchical tree of smaller blocks which size may vary and which are the actual blocks to encode. These smaller blocks to encode are referred to as Coding Unit (CU).

The encoding of a particular Coding Unit is typically predictive. This means that a predictor block is first determined. Next, the difference between the predictor block and the Coding Unit is calculated. This difference is called the residue. Next, this residue is compressed. The actual encoded information of the Coding Unit is made of some information to indicate the way of determining the predictor block and the compressed residue. Best predictor blocks are blocks as similar as possible to the Coding Unit in order to get a small residue that could be efficiently compressed.

Encoding may be lossy, meaning that information is lost in the encoding process. The decoded block of pixel is not exactly the same as the original Coding Unit. Typically the loss of information comes from a quantization applied to the residue before entropy coding. This quantization allows a higher compression rate at the price of the loss of accuracy. Typically, high frequencies, namely the high level of details, are removed in the block.

Encoding may be lossless, meaning that the residue is not quantized. This kind of encoding allows retrieving the exact copy of the original samples of the Coding Unit. The lossless encoding is obtained at the expense of compression rate which is much smaller compared to a lossy compression.

The coding mode is defined based on the method used to determine the predictor block for the predictive encoding method of a Coding Unit.

A first coding mode is referred to as INTRA mode. According to INTRA mode, the predictor block is built based on the value of pixels immediately surrounding the Coding Unit within the current image. It is worth noting that the predictor block is not a block of the current image but a construction. A direction is used to determine which pixels of the border are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

A second coding mode is referred to as INTER mode. According to INTER mode, the predictor block is a block of another image. The idea behind the INTER mode is that successive images in a sequence are generally very similar. The main difference comes typically from a motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residue.

We focus in this document on a third coding mode called INTRA Block Copy mode. According to the INTRA Block Copy mode, the block predictor is an actual block of the current image. A displacement vector is used to locate the predictor block. This displacement gives the location in the current image of the predictor block relatively to the location of the Coding Unit in the same current image. It comes that this displacement vector shares some similarities with the motion vector of the INTER mode. It is sometime called motion vector by analogy. As there could not be a motion within an image, strictly speaking, and for the sake of clarity, in this document motion vector always refer to the INTER mode while displacement vector is used for the INTRA Block Copy mode.

The causal principle is the principle that states that all information to decode a particular Coding Unit must be based on already reconstructed Coding Units. At encoding, the whole information may be considered as available. Namely, to encode a given Coding Unit it would be possible to use any information from the entire current images or from all decoded and available other images in the sequence. At decoding, things are different. The decoding of the current images is typically done by decoding sequentially all Coding Unit. The order of decoding follows typically a raster scan order, namely beginning in the upper left of the image, progressing from left to right and from top to bottom. It comes that when decoding a given Coding Unit, only the part of the current image located up or left to the current Coding Unit has already been decoded. This is the only available information for the decoding of the current Coding Unit. This has to be taken into account at encoding. For example, a predictor block in INTRA Block Copy mode, should pertain to the part of the image that will be available at decoding.

In INTRA Block Copy mode, the displacement vector is typically encoded by using the regular motion vector difference (MVD) coding of the INTER mode. This encoding consists, for a component of the vector, in coding whether this component is zero, and if not, to encode its sign and its magnitude. Both components corresponding to the vertical and horizontal directions are encoded that way.

SUMMARY OF THE INVENTION

The present invention has been devised to improve the encoding of the displacement vector in INTRA Block Copy mode.

It proposes to take into account the particular constraints brought by the causal principle in the range of admissible values of the components of the displacement vector. In particular, for some values of one first component, the second component is transformed in order to improve the coding efficiency for it.

According to a first aspect of the invention there is provided a method for encoding values of a first and a second component of a vector representative of the position in an image of a predictor block used to predict a current Coding Unit of the same image, wherein the method comprises: determining a range of allowed values for the second component of said vector as a function of the value of the first component; transforming the value of the second component of said vector in function of the determined range; encoding the value of the first component of said vector and the transformed value of the second component of said vector.

Accordingly, the magnitude of the second component is reduced improving the coding of its value.

According to an embodiment, the transforming step comprises determining an offset value to be added to the second component before encoding it so that the rate of the second component after encoding is minimized.

According to an embodiment, an information representative of the offset value is inserted in a bitstream portion associated with the current Coding Unit.

According to an embodiment, determining a range of allowed values for the second components of said vector comprises: determining from the obtained value of a first component of said vector any allowed positions of the predictor block within a causal area.

According to an embodiment, wherein a Coding Unit being a rectangle of N×M pixels, N and M being positive integers, the method comprises: determining the range of allowed values for the second component of said vector as being [−∞; −N] when the value of the first component is greater than −M; transforming the second component by adding to its value an offset greater than or equal to N.

According to an embodiment, the offset is a function of at least N.

According to an embodiment, the offset is 2×N.

According to an embodiment, the second component of the vector is an horizontal component, the first component being a vertical component.

According to another aspect of the invention there is provided a method for decoding values of a first and a second component of a vector representative of the position in an image of a predictor block used to predict a current Coding Unit of the same image, wherein the method comprises: decoding the value of a first component of said vector; determining a range of allowed values for the second component of said vector as a function of the value of the first component; decoding the value of the second component of said vector; transforming the value of the second component of said vector in function of the determined range.

According to an embodiment, the transforming step comprises determining an offset value, used for minimizing the rate of the second component after encoding, to be subtracted to the second component after decoding it.

According to an embodiment, an information representative of the offset value is obtained from a bitstream portion associated with the current Coding Unit.

According to an embodiment, determining a range of allowed values for the second component of said vector comprises: determining from the decoded value of a first component of said vector any allowed position of the predictor block within a pre-defined causal area.

According to an embodiment, a Coding Unit being a rectangle of N×M pixels, N and M being positive integers, the method comprises: determining the range of allowed values for the second component of said vector as being [−∞; −N] when the value of the first component is greater than −M; transforming the second component by subtracting to its value an offset greater than or equal to N.

According to an embodiment, the offset is a function of at least N.

According to an embodiment, the offset is 2×N.

According to an embodiment, the second component of the vector is an horizontal component, the first component being a vertical component.

According to another aspect of the invention, there is provided an encoding device for encoding values of a first and a second component of a vector representative of the position in an image of a predictor block used to predict a current Coding Unit of the same image, wherein the encoder comprises: a range module for determining a range of allowed values for the second component of said vector as a function of the value of the first component; a transformation module for transforming the value of the second component of said vector in function of the determined range; an encoding module for encoding the value of the first component of said vector and the transformed value of the second component of said vector.

According to another aspect of the invention there is provided a decoding device for decoding values of a first and a second component of a vector representative of the position in an image of a predictor block used to predict a current Coding Unit of the same image, wherein the decoder comprises: a decoding module for decoding the value of a first and a second component of said vector; a range module for determining a range of allowed values for the second component of said vector as a function of the value of the first component; a transforming module for transforming the value of the second component of said vector in function of the determined range.

According to another aspect of the invention there is provided a computer program product for a programmable apparatus, the computer program product comprising a sequence of instructions for implementing a method according to the invention, when loaded into and executed by the programmable apparatus.

A non-transitory computer-readable storage medium storing instructions of a computer program for implementing a method according to the invention.

An information storage means readable by a computer or a microprocessor storing instructions of a computer program, wherein it makes it possible to implement the method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE PREFERRED EMBODIMENT

Figure 1:
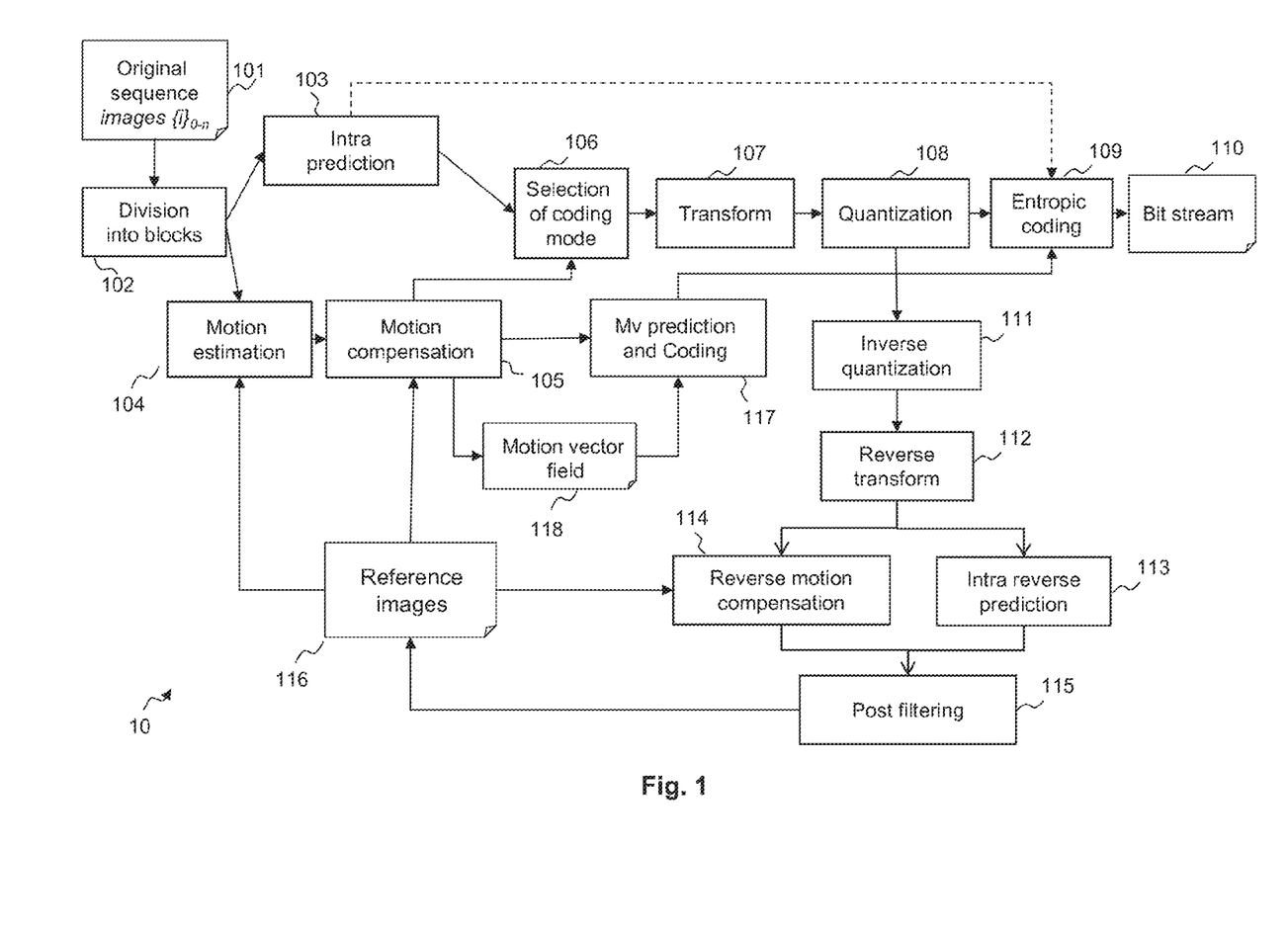
FIG. 1 illustrates the HEVC encoder architecture.

FIG. 1 illustrates the HEVC encoder architecture. In the video encoder, an original sequence 101 is divided into blocks of pixels 102. A coding mode is then affected to each block. There are two families of coding modes typically used in HEVC: the modes based on spatial prediction or INTRA modes 103 and the modes based on temporal prediction or INTER modes based on motion estimation 104 and motion compensation 105. An INTRA Coding Unit is generally predicted from the encoded pixels at its causal boundary by a process called INTRA prediction.

Temporal prediction first consists in finding in a previous or future frame called the reference frame 116 the reference area which is the closest to the Coding Unit in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighboring motion vectors, used for the prediction, are extracted from the motion vector field 118.

Then, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Then, this first reconstruction is filtered in module 115 by one or several kinds of post filtering. These post filters are integrated in the encoded and decoded loop. It means that they need to be applied on the reconstructed frame at encoder and decoder side in order to use the same reference frame at encoder and decoder side. The aim of this post filtering is to remove compression artifacts.

Figure 2:
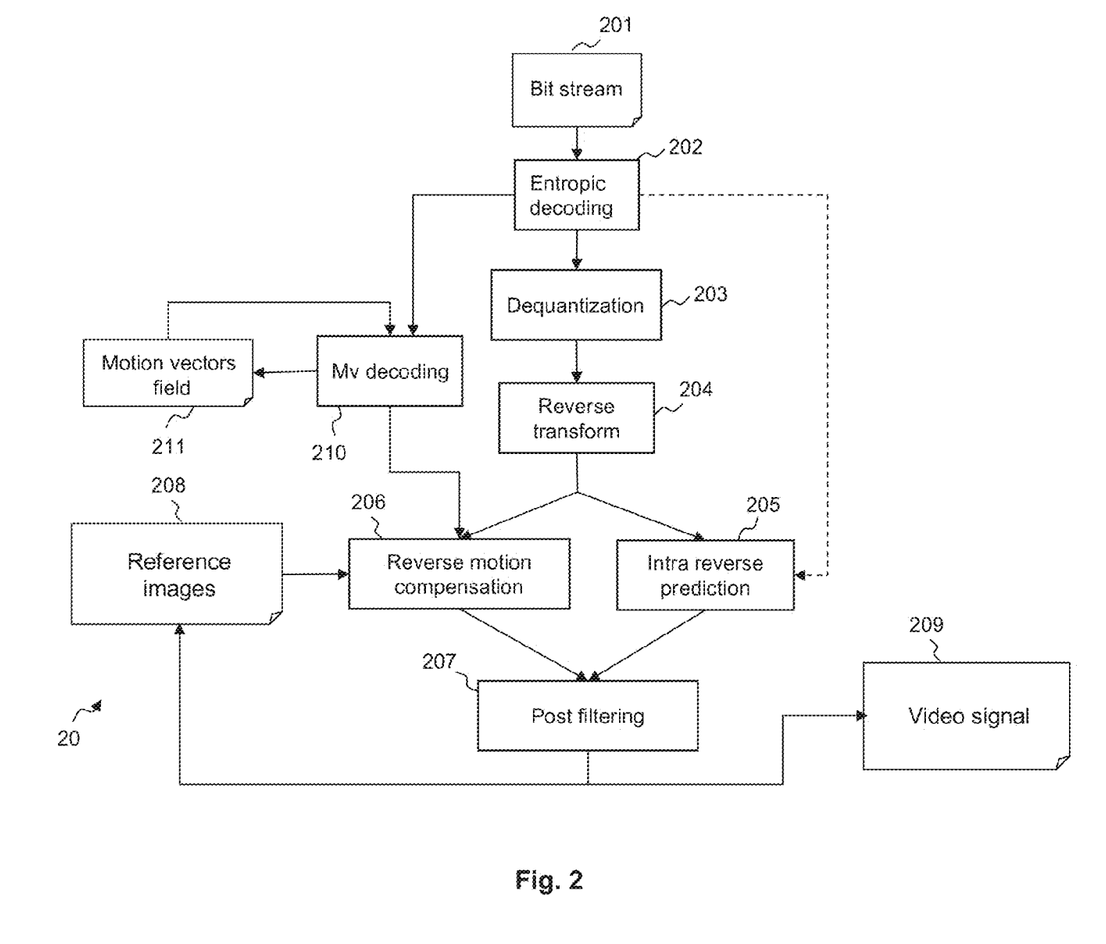
FIG. 2 illustrates the HEVC decoder architecture.

In FIG. 2, the principle of a decoder has been represented. The video stream 201 is first entropy decoded in a module 202. The residual data are then inverse quantized in a module 203 and inverse transformed in a module 204 to obtain pixel values. The mode data are also entropy decoded and in function of the mode, an INTRA type decoding or an INTER type decoding is performed. In the case of INTRA mode, an INTRA predictor is determined in function of the INTRA prediction mode specified in the bitstream 205. If the mode is INTER, the motion information is extracted from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

This INTRA Block Copy coding mode is particularly well suited for extremely repetitive patterns. In particular, it is known to help coding graphical elements such as glyphs, the graphical representation of a character, or traditional GUI elements, which are very difficult to code using traditional INTRA prediction methods.

Figure 3:
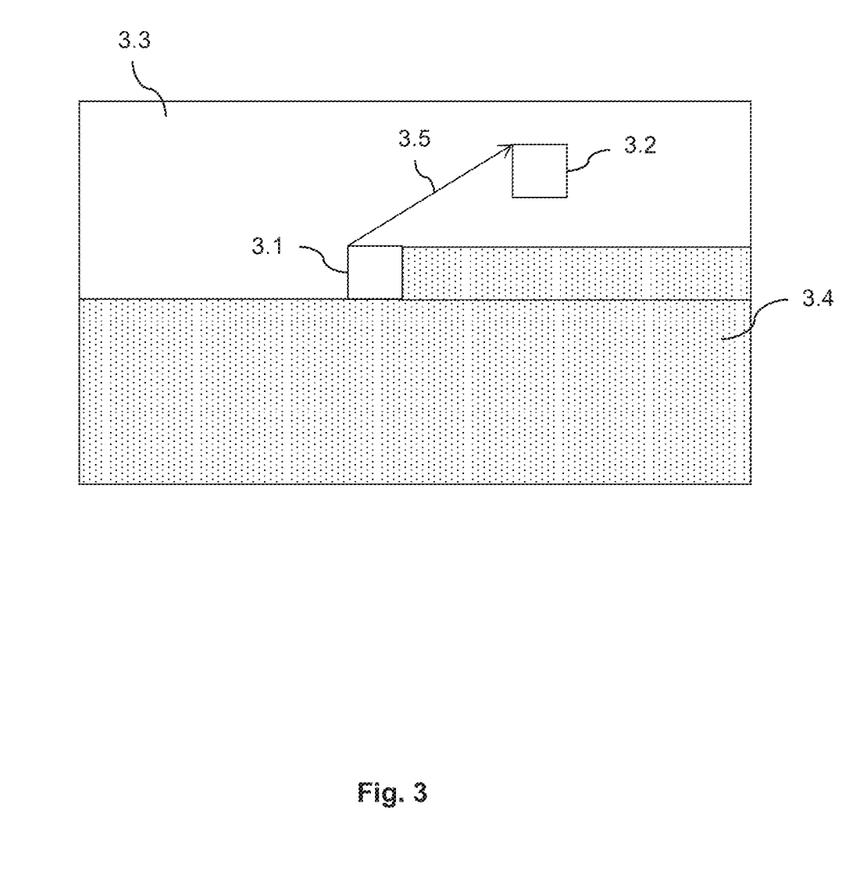
FIG. 3 illustrates the concept of the causal area.

FIG. 3 illustrates how this prediction method works. At a high-level, an image is divided into Coding Units that are encoded in raster scan order. Thus, when coding block 3.1, all the blocks of area 3.3 have already been encoded, and can be considered available to the encoder. Area 3.3 is called the causal area of the Coding Unit 3.1. Once Coding Unit 3.1 is encoded, it will belong to the causal area for the next Coding Unit. This next Coding Unit, as well as all the next ones, belongs to area 3.4 illustrated as doted area, and cannot be used for coding the current Coding Unit 3.1. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks.

INTRA Block Copy works by signaling a block 3.2 in the causal area which should be used to produce a prediction of block 3.1. In the HEVC Range Extension draft specifications (at the time of writing, Draft 4 from document JCTVC-N1005-v3), this block is indicated by a displacement vector 3.5, and is transmitted in the bitstream.

This displacement vector is the difference in coordinates between a particular point of the Coding Unit 3.1 and the equivalent point in the predictor block 3.2. Although it would be possible to use sub-pixel accuracy as for INTER blocks, this displacement is typically in integer units of pixels, therefore not to require costly sub-pixel interpolation. This vector is coded in the simplest way currently, the vector is not predicted, and the coordinates are coded using HEVC regular motion vector difference (MVD) coding commonly used for the INTER mode.

Put in a simple way, the motion vector difference coding consists, for a value d, in coding whether d is zero, and if not, to further encode its sign and its magnitude minus 1. In HEVC motion vector difference coding interleaves the x and y components of the vector.

Figure 4:
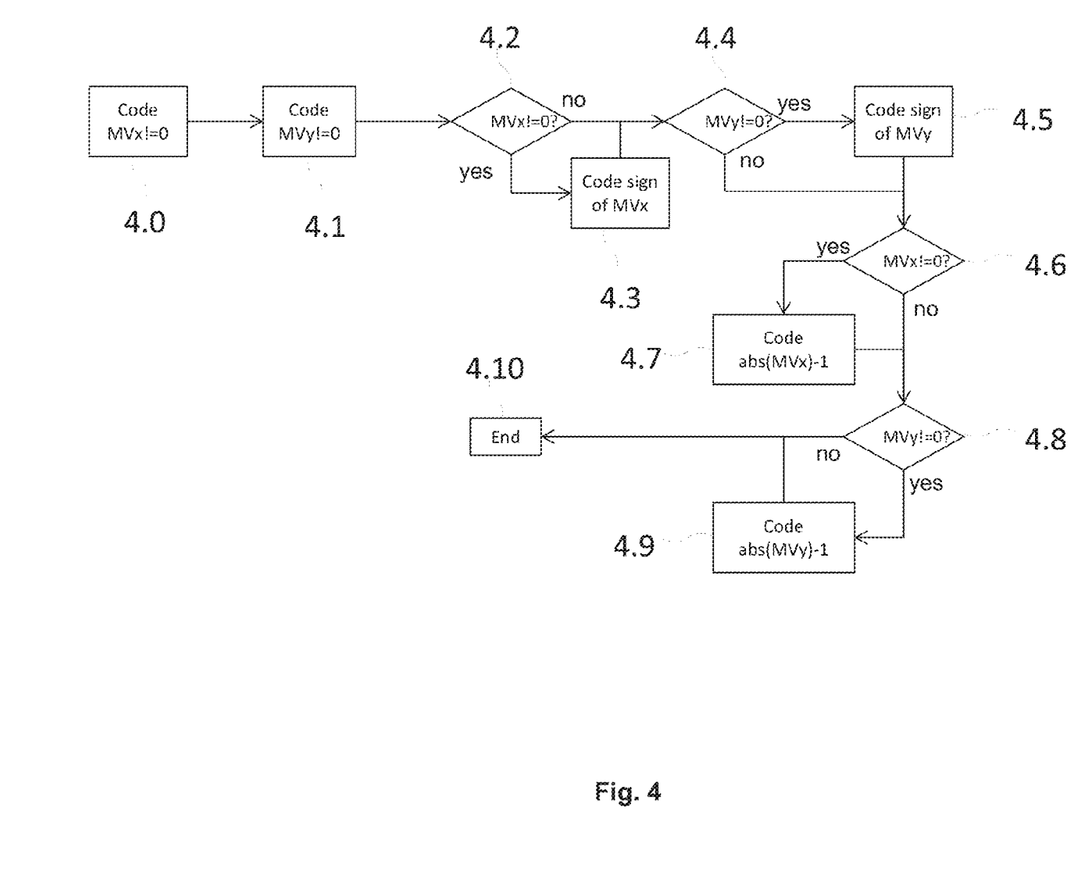
FIG. 4 illustrates the coding of a motion vector difference in HEVC.

The motion vector difference coding is illustrated in FIG. 4. Please note that in HEVC each part of the encoding (or decoding) of a component is interleaved with the corresponding part for the other component, and therefore no shortcut can be taken when one component is null. In the following, the abscissa of a vector to encode is noted MVx, and its ordinate is noted MVy. The Boolean value to indicate whether MVx is null is coded during step 4.0, followed by the Boolean value to indicate whether MVy is null in step 4.1. Then, step 4.2 checks whether MVx is non-null, in which case it codes the sign of MVx in step 4.3. (which is equivalent to testing whether MVx>1 as the Boolean indicating that MVx is null has already been encoded). In all cases, step 4.4 follows: it checks whether MVy is non-null. If such is the case, step 4.5 codes the sign of MVy.

Then, in all cases, step 4.6 occurs: it checks whether MVx is non-null, in which case the magnitude of MVx minus 1 is coded during step 4.7. In all cases, step 4.8 follows, which checks whether MVy is non-null. If such is the case step 4.9 occurs and the magnitude of MVy minus 1 is coded. In all cases, the MVD coding of the two components can then end at step 4.10.

It is not very worthwhile to describe the corresponding decoder: one just needs to swap any occurrence of "encode" by "decode" in the two previous paragraphs.

Figure 5A:
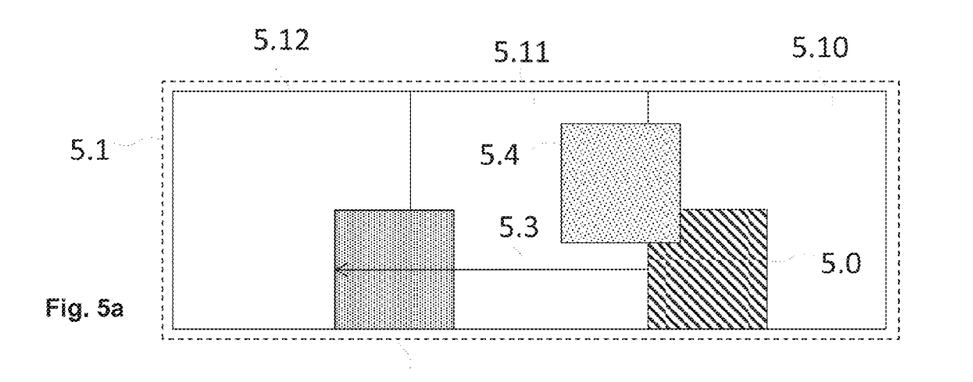
FIG. 5a, 5b, 5c illustrates the concept of the causal area and its restrictions in INTRA Block Copy encoding mode.
Figure 5B:
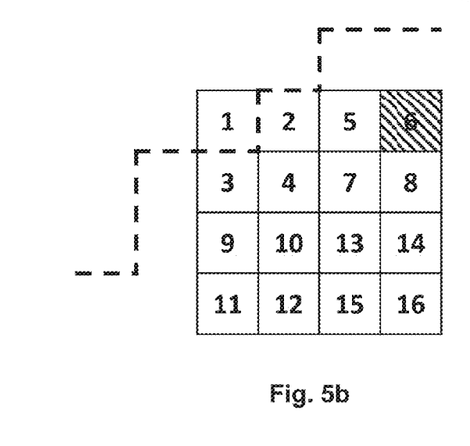
Figure 5C:
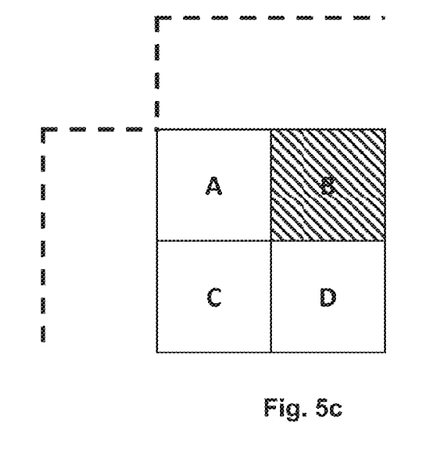

FIGS. 5a, 5b and 5c illustrates the definition of the causal area and some of the restriction than can apply to HEVC.

In order to encode the Coding Unit 5.0, the encoder must evaluate different possible predictor blocks in the causal area. Because this is a significantly complex task as it is the case for motion estimation for INTER blocks, a search window 5.1 must be defined. This window defines the actual set of positions that can be tested. The causal area is therefore the part of the image that has been already reconstructed when contemplating the reconstruction of the current Coding Unit. Pixels belonging to the causal area are available for the reconstruction of the current Coding Unit. It does not comprise the current Coding Unit by definition.

In that case, we have illustrated the case chosen by a specific implementation of a HEVC encoder: window 5.1 is made of the current Coding Tree Block 5.10 and its two neighbors Coding Tree Block 5.11 and 5.12 on the left.

When considering a potential position and the corresponding prediction block 5.2 and its associated vector 5.3, one can distinguish the cases where only causal data is accessed. Block 5.2 does not overlap block 5.0, but block 5.4 does. Therefore, part of block 5.4 actually does not use causal pixels and is not possible for INTRA Block Copy. Block 5.4 cannot be used as a proper predictor block for the prediction of the Coding Unit 5.0.

This can be further illustrated on FIG. 5b. Here, we illustrate the coding order used in HEVC: while Coding Tree Blocks are coded in raster scan order (as depicted in FIG. 3), Coding Units follow a different pattern, called Z-order. In that order, the Coding Tree Block is split in Coding Units 1, 2, 3, 4, 5 and 6 (and so on) that are coded in that order. The raster scan order would have coded these Coding Units in the 1, 2, 5, 6, 3, 4 order. As a consequence, when coding Coding Unit 6, all Coding Units from 7 to 16 are not yet coded, and belong to the equivalent of area 3.4 of FIG. 3. Combined with the non-overlapping requirement illustrated above, one can draw the limit, represented here by the thick dashed line, of the possible positions: below these line positions, data corresponding to impossible positions of the MV displacement is lying.

FIG. 5c illustrates this in the same fashion for a different Coding Unit size: Coding Unit A has been coded while Coding Unit B is being coded, and Coding Units C and D are not yet coded, yielding a slightly different area.

One aspect of the invention consists in taking into account a constraint, typically the impossible area, and the specific coding of the vector in order to transform at least one component of the displacement vector in order to improve its encoding. More specifically, the chosen solution is to use information from one component of the vector to infer a range of possible values for the second component. This second component is transformed so as to code it more efficiently taking into account the inferred range. In an embodiment, the transformation consists in adding an offset to the value of the second component. This transformation may result in a reduction of the magnitude of the second component. This allows reducing the needed bits to encode this second component.

Figure 6A:
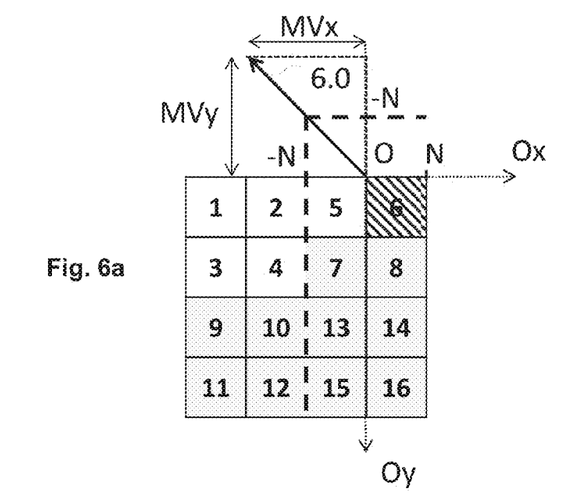
FIG. 6a, 6b, 6c illustrates the definition in some embodiments of the invention of particular allowed areas in INTRA Block Copy mode.
Figure 6B:
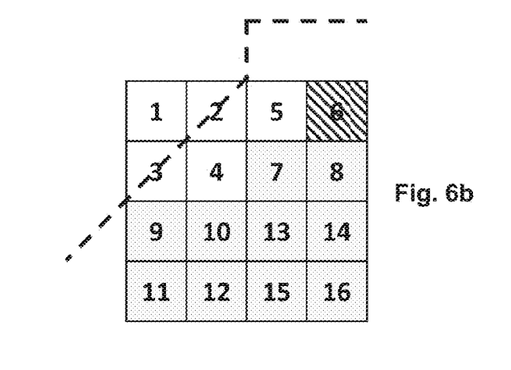
Figure 6C:
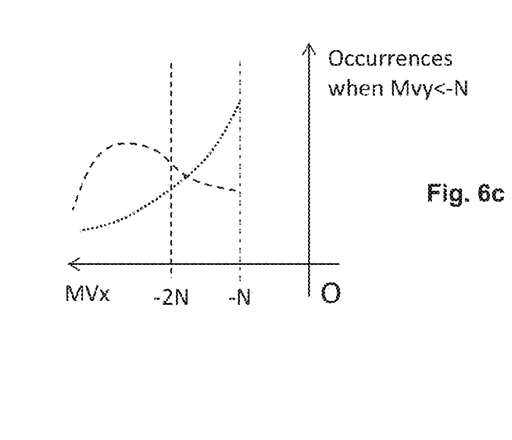

FIGS. 6a, 6b and 6c illustrate such a simple solution. A particular limit is drawn on FIG. 6a, in a similar fashion to FIGS. 5a, 5b and 5c. Vector 6.0 points to a particular prediction block. Let us consider its coordinates MVx and MVy. In a typical raster-scan/top-to-bottom coding order as used in HEVC, MVx and MVy are both negative according to the reference axis (Ox, Oy). Let us note N the size of the Coding Unit 6 being coded, in pixels. In that case, we can express a simple constraint that is always true: the position is forbidden if MVx>−N and MVy>−N, which is what is depicted by the thick dashed line.

Therefore, if MVy>−N, then MVx≤−N. From a condition on the component MVy, it is possible to deduce a range of possible values for the second component, namely the range [−∞; −N]. This can be used to reduce the magnitude of the value that is coded: instead of coding MVx, it is beneficial to code MVx+P, P being some positive value greater or equal to N. As MVx is always negative, the magnitude of MVx+P is actually lesser than the magnitude of MVx leading to a better coding efficiency. It has been determined that it is more efficient to transform MVx than MVy.

However, because of the particular coding of HEVC, setting P=N is not the optimal value. It has been found that P=2×N is the actual best value for P. This can be explained using FIG. 6c. The usual way to usually design an entropy code, here for MVx, is to take into account the probabilities and therefore producing the least bits for the most frequent symbol. However, here, the solution taken is to instead modify the value of P so as to produce this effect when modifying MVx. We have illustrated two possibilities: one kind of occurrences as a dashed curve in FIG. 6.c, and a dotted one. Actually, the first one is the most realistic one, and therefore P=N is unsuited to re-center possibilities. As a consequence, given our knowledge of the range of values for MVx, we can provide a better estimate of P. It would therefore also be possible to derive an even better value of P by computing statistics: for each possible value of N, the value of P leading to the best coding efficiency can be transmitted instead of implicitly determined. A way to compute it for a given value of N, a given cost function C(x) to code a value, a given range of values for MVx and a given probability function P(MVx) for MVx, to find the value of P that minimizes the sum over all values of MVx of P(MVx) times C(MVx+N). Marginal gains are possible by exploring further the idea, like the bent thick dashed line illustrated in FIG. 6b which formula would be: when MVy>0, P=N+MVy.

According to an embodiment, the transforming step transforms the value of the second component so that the statistics of values, e.g. the occurrences of the transformed values, of second component of vectors is centered on 0.

According to another embodiment, the P value is found through a classical minimization problem of finding the value of P minimizing the total rate. Given a range R of values of MVx, a rate function C(MVx) giving the number of bits output for coding a particular value of MVx, and the probability function P(MVx) of MVx (giving for each possible value of MVx the probability/number of occurrences of that value), the problem to solve is:

$$\min_P \left( \sum_{MVx \in R} C(MVx + P) R(MVx) \right)$$

This problem can be solved by a variety of techniques. Due to the very likely value of P, it is possible to simply evaluate each value of the sum for several values of P around the expected one, and take the value of P that yields the smallest sum value.

Figure 7A:
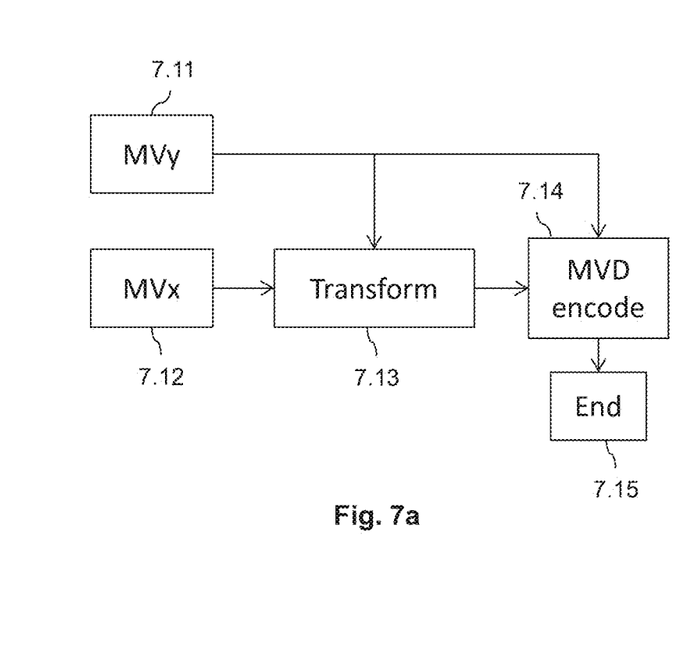
FIGS. 7a and 7b illustrates the transformation process of an embodiment of the invention at the encoder side, FIG. 7a, and at the decoder side, FIG. 7b.
Figure 7B:
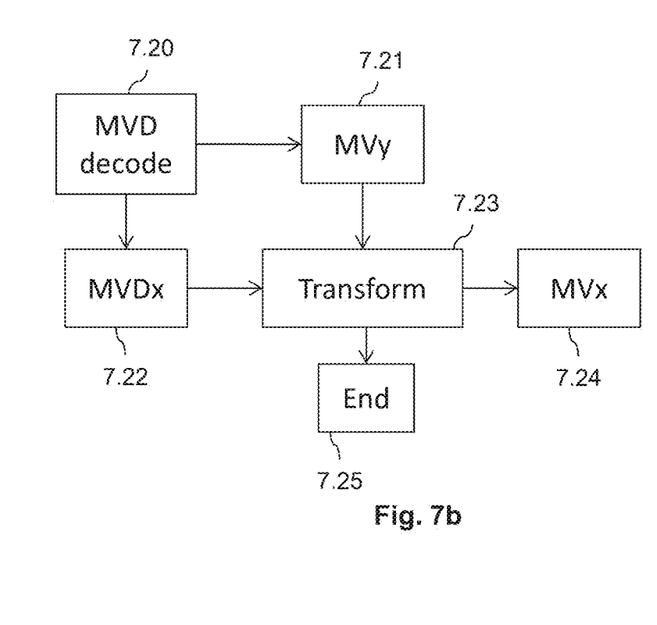

FIG. 7a illustrates an embodiment of a module for encoding INTRA Block Copy "displacement" vectors. The "displacement" vector is produced by a module typically located in step 117 of FIG. 1. This vector is therefore contained in the Prediction Parameters of that figure, which are going to be coded by step 1.10, where the steps of FIG. 7 are located.

Therefore, 2 components 7.11 and 7.12 for the vector are generated, named here MVy and MVx. It should be noted that another embodiment may use the same scheme, except inverting the locations of MVy and MVx. Anyway, step 7.13 purpose is to transform component 7.12 according to component 7.11, and is the location of our invention.

In any case, a transformed value of MVx is output by step 7.13. The MVD encoding step of step 7.14 may then be invoked, which may correspond to the HEVC process described above in FIG. 4. Step 7.15 ends the processing, typically by flushing the entropy coder, resetting or updating the state of the encoder, going on to evaluate another coding mode, etc.

In one embodiment, if MVy satisfies a given criterion, then MVx is transformed in a way, otherwise it is transformed in another way. The criterion may for instance be whether MVy is below a threshold. A transformation may consist in adding an offset to MVx. The offset may be a predetermined value either fixed or computed by the encoder and transmitted as part of the bitstream. The offset may also depend on some other properties of the block like for example the size or the depth of the Coding Unit.

For a given Coding Unit of size N×M, the threshold may be related to M and the offset may depend on N. An example of this, in order to find the transformed and encoded value MVDx of MVx, is:

If MVy>−M then MVx=MVx+2 N otherwise MVx is not modified.

Multiple criterions on MVy may be used. One or several of these criteria may depend on M. For instance the criterion may be whether MVy is below a set of thresholds Ti, each threshold possibly depending on M. Each criterion may be associated with a particular transformation. For example, each transform may be based on a related offset which may depend on the size N. One or several transformations may consist in not modifying the component.

An example of this is:
If MVy>M then, if N<64, MVx=MVx+3 N, else MVx=MVx+128
Else if MVy>−M then MVx=MVx+2 N
Else MVx is untouched FIG. 7b presents an embodiment of the decoder.

The MVD entropy decoder 7.20 first receives a bitstream portion and outputs 2 vector components 7.21 and 7.22, which in our preferred embodiment respectively represent the vertical and horizontal components. It must of course correspond to what the encoder does, i.e. it may instead be the horizontal and vertical ones.

Given the first component 7.21, the inverse of transform 7.13 from FIG. 7 is performed on the second component 7.22. Using the above examples, this process may respectively be:
Either: if MVy>−M then MVx=MVDx−2 N otherwise MVx=MVDx
Or:
(1) If MVy>M then, if N<64, MVx=MVDx−3 N, else MVx=MVDx−128
(2) Else if MVy>−M then MVx=MVDx−2 N
(3) Else MVx=MVDx Generally speaking, given a criterion at the encoder where an offset was added to transform a component, the same criterion shall be applied at the decoder side and the same offset should be subtracted from this component. This explains also why it is not possible to apply any non-reversible transform.

In any case, step 7.23 outputs the vector component 7.24 from its input, and together with vector component 7.21, the vector is completely decoded, and the output may end on step 7.25. This can be for instance the INTRA Block Copy prediction, located on step 205 of FIG. 2.

Figure 8:
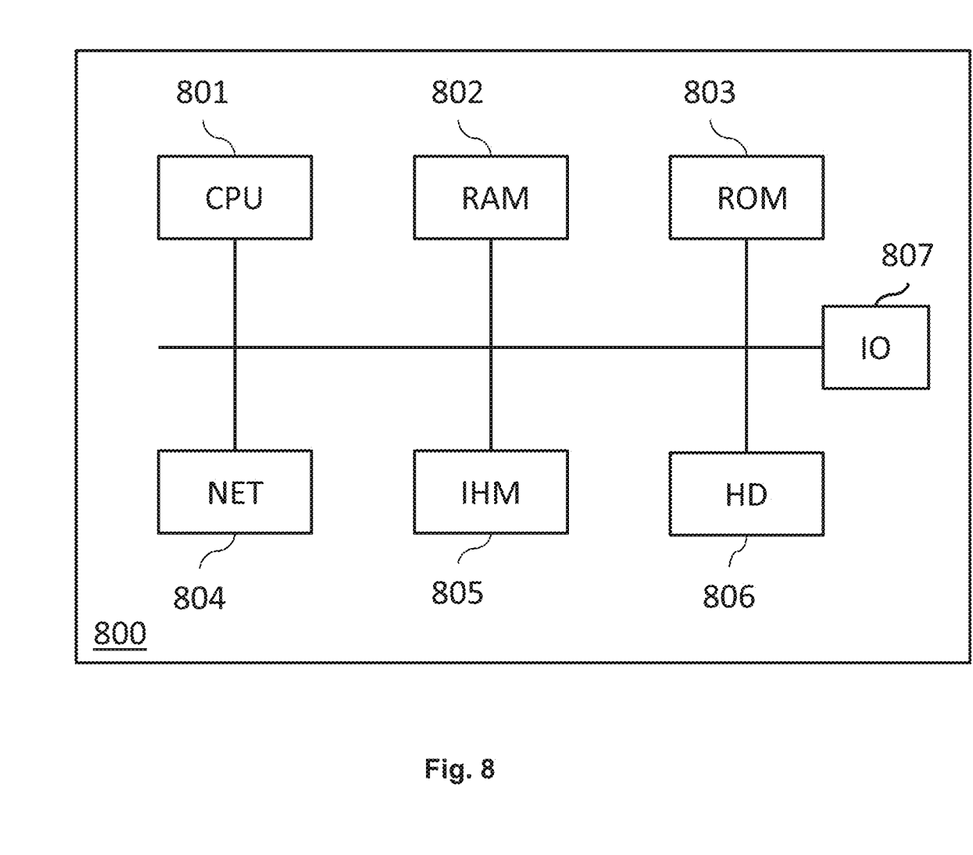
FIG. 8 is a schematic block diagram of a computing device for implementation of one or more embodiments of the invention.

FIG. 8 is a schematic block diagram of a computing device 800 for implementation of one or more embodiments of the invention. The computing device 800 may be a device such as a micro-computer, a workstation or a light portable device. The computing device 800 comprises a communication bus connected to:
a central processing unit 801, such as a microprocessor, denoted CPU;
a random access memory 802, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;

a read only memory 803, denoted ROM, for storing computer programs for implementing embodiments of the invention;

a network interface 804 is typically connected to a communication network over which digital data to be processed are transmitted or received. The network interface 804 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 801;

a user interface 805 may be used for receiving inputs from a user or to display information to a user;

a hard disk 806 denoted HD may be provided as a mass storage device;

an I/O module 807 may be used for receiving/sending data from/to external devices such as a video source or display.

The executable code may be stored either in read only memory 803, on the hard disk 806 or on a removable digital medium such as for example a disk. According to a variant, the executable code of the programs can be received by means of a communication network, via the network interface 804, in order to be stored in one of the storage means of the communication device 800, such as the hard disk 806, before being executed.

The central processing unit 801 is adapted to control and direct the execution of the instructions or portions of software code of the program or programs according to embodiments of the invention, which instructions are stored in one of the aforementioned storage means. After powering on, the CPU 801 is capable of executing instructions from main RAM memory 802 relating to a software application after those instructions have been loaded from the program ROM 803 or the hard-disc (HD) 806 for example. Such a software application, when executed by the CPU 801, causes the steps of the flowcharts shown in FIGS. 1, 2, 7a and 7b to be performed.

Any step of the algorithm shown in FIGS. 1, 2, 7a and 7b may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for decoding values of a first and a second component of a vector representative of the position in an image of a predictor block used to predict a current Coding Unit of the same image, wherein the method comprises:
   decoding the value of a first component of said vector;
   determining a range of allowed values for the second component of said vector as a function of the value of the first component;
   decoding the value of the second component of said vector;
   transforming the value of the second component of said vector in function of the determined range.

2. The method according to claim 1, wherein the transforming step comprises determining an offset value, used for minimizing the rate of the second component after encoding, to be subtracted to the second component after decoding it.

3. The method according to claim 2 wherein an information representative of the offset value is obtained from a bitstream portion associated with the current Coding Unit.

4. The method according to claim 1, wherein determining a range of allowed values for the second component of said vector comprises:
   determining from the decoded value of a first component of said vector any allowed position of the predictor block within a pre-defined causal area.

5. The method according to claim 1, wherein a Coding Unit being a rectangle of N×M pixels, N and M being positive integers, the method comprises:
   determining the range of allowed values for the second component of said vector as being [−∞; −N] when the value of the first component is greater than −M;
   transforming the second component by subtracting to its value an offset greater than or equal to N.

6. The method according to claim 5 wherein the offset is a function of at least N.

7. The method according to claim 6, wherein the offset is 2×N.

8. The method according to claim 1, wherein the second component of the vector is a horizontal component, the first component being a vertical component.

9. A decoding device for decoding values of a first and a second component of a vector representative of the position in an image of a predictor block used to predict a current Coding Unit of the same image, wherein the decoder comprises:
   a decoding module for decoding the value of a first and a second component of said vector;
   a range module for determining a range of allowed values for the second component of said vector as a function of the value of the first component;
   a transforming module for transforming the value of the second component of said vector in function of the determined range.

10. A non-transitory computer-readable storage medium on which is stored codes of an executable program causing a computer to execute each of the steps of the method according to claim 1.

* * * * *